United States Patent
Betzl et al.

[11] Patent Number: 5,203,029
[45] Date of Patent: Apr. 13, 1993

[54] COMBINER CIRCUIT IN SPACE-DIVERSITY RECEPTION

[75] Inventors: Hermann Betzl, Penzberg; Josef Nossek, Iffeldorf, Fed. Rep. of Germany

[73] Assignee: Siemens Aktiengesellschaft, Munich, Fed. Rep. of Germany

[21] Appl. No.: 704,959

[22] Filed: May 23, 1991

[30] Foreign Application Priority Data

May 31, 1990 [EP] European Pat. Off. ......... 90110392.9

[51] Int. Cl.$^5$ ............................................. H04B 17/02
[52] U.S. Cl. ..................................... 455/137; 455/139; 455/273; 455/276.1
[58] Field of Search ............... 455/136–139, 455/273, 276, 278, 226.1, 226.2, 276.1, 278.1

[56] References Cited

U.S. PATENT DOCUMENTS

| | | | |
|---|---|---|---|
| 4,334,316 | 6/1982 | Tanaka | 455/276 |
| 4,354,276 | 10/1982 | Karabinis | 455/139 |
| 4,512,034 | 4/1985 | Greenstein et al. | 455/278 |
| 4,710,975 | 12/1987 | Okamoto et al. | 455/276 |
| 4,939,791 | 7/1990 | Bochmann et al. | 455/139 |

FOREIGN PATENT DOCUMENTS

3413273 10/1985 Fed. Rep. of Germany .
880673 10/1961 United Kingdom .

Primary Examiner—Reinhard J. Eisenzopf
Assistant Examiner—Edward Urban
Attorney, Agent, or Firm—Hill, Steadman & Simpson

[57] ABSTRACT

A combiner circuit employs the maximum power method, in which the phase of one of the signals is varied such that the power of the aggregate signal (main and diversity) is varied such that the power of the aggregate subsequently formed is optimally high. In order to improve this combining method that becomes less and less efficient with increasing bandwidth and number of steps of signals, particularly given selective fading, it is provided that the combiner circuit contains a control circuit for the combination phase, the control circuit being composed of a maximum power control circuit and of two preceding, supplementary circuits for varying the amplitudes of the main and diversity signals. The amplitude variation of the main and diversity channel spectrum occurs in such a fashion that the signal spectra are split in the appertaining branches of the two supplementary circuits by respective identical bandpass filters for the lower spectrum half and the upper spectrum half, the powers of the sub-bands are measured at the outputs of the bandpass filters and both sub-bands are set to approximately identical values.

8 Claims, 2 Drawing Sheets

COMBINER CIRCUIT IN SPACE-DIVERSITY RECEPTION

BACKGROUND OF THE INVENTION

1. Field of the Invention

The present invention relates to a combiner circuit for signals received via a main antenna and via a diversity antenna of a radio link, utilizing the maximum power method, whereby the phase of one of the signals is varied such that the power of the aggregate signal subsequently formed is optimally high.

2. Description of the Prior Art

In the article of P. D. Karabinis entitled "Maximum Power and Amplitude-Equalizing Algorithms for Phase Control in Space Diversity Combining", published in the B.S.T.J. Vol. 62, No. 1, January, 1983, pp. 63-189, the above-described most standard type of combining main and diversity received signals is described.

This method is beneficial in instances of pure, planar fading (frequency-independent attenuation of the received signals), but is not beneficial in instances having selective fading (frequency-dependent attenuation) of the received signals. In this latter case, combining according to the maximum power principle can, in fact, lead to a powerful, but nonetheless excessively-distorted, received signal. A second combining method is, therefore, recommended, the criterion for the combination phase therein being the minimum frequency response of the aggregate output signal. What is referred to as the minimum dispersion method is described in the article "A Minimum Dispersion Combiner for High-Capacity Digital Microwave Radio" by S. Komaki et al, which was published in the *IEEE Trans. Commun.*, Vol. Com-32, April 1984, pp. 419-428.

This method also has disadvantages in that, in particular, the signal level can drop to such an extent in the attempt to make the frequency response of the aggregate signal low that a receiving outage occurs.

There are, therefore, also proposals to either combine the minimum dispersion method with the maximum power method in that a switch to maximum power is undertaken, given poor signal-to-noise ratios (see European Patent 0 128 812 A2) or in that an evaluation quantity that one attempts to improve by trial-and-error modification of the phase is calculated from the measured receiving parameter. This latter method is known, for example, from the article of Y. S. Yeh and L. J. Greenstein entitled "A New Approach to Space Diversity Combining in Microwave Digital Radio", published in the *AT&T Tech. Journal*, Vol. 64, No. 4. April 4, 1985, pp. 885-905. In contrast to the maximum power method, the phase must, thereby, be varied by trial and error, i.e., must sometimes also be varied in the wrong direction in order to find the optimum.

In a radio relay system having space diversity reception, the signals received via the main and diversity antennas of the radio link should, insofar as possible, be combined in the receiver such that the bit error ratio (BER) of the demodulated digital signal becomes optimally low and the number of outages (with $BER > 10^{-3}$) of the received signal is thereby simultaneously minimized. An optimally-effective of the received signals becomes all the more necessary higher the number of steps in the system (for example, 64 QAM or 256 QAM) and the greater the bandwidth. In the planned employment of two carrier systems, the received signal width is approximately twice as great than in previous signal-carrier systems because of the two sub-bands lying side-by-side. For reasons of expense, however, it is desirable to process both sub-bands in common in a suitable combiner.

SUMMARY OF THE INVENTION

The present invention, therefore, is to improve the maximum power combining method that becomes poorer and poorer with increasing band width and the number of steps of the signals, particularly given selective fade.

The above object is achieved, according to the present invention, by the provision of a control circuit for the combining phase, the control circuit being composed of a maximum power control circuit and of two preceding, supplementary circuits, each of which has, respectively, two parallel branches for varying the amplitudes of the main and diversity signals, and by the amplitude variation of the main channel and the diversity channel spectrums in such a fashion that the signal spectra are split into the appertaining branches of the two supplementary circuits by, respectively, identical, equal bandpass filters for the lower spectrum halves and identical, equal bandpass filters for the upper spectrum halves and the powers of the individual sub-bands are measured at the outputs of the bandpass filters and are set to approximately identical values or to a somewhat higher value than the weaker sub-band by, respectively, boosting the weaker sub-band or attenuating the more powerful sub-band.

The difficulties initially set forth are avoided with this solution in that, in particular, the maximum power principle is formally retained, by the spectra to be combined that are supplied to the maximum power control circuit are designationally varied in terms of amplitude. The reason for this is that portions of a spectrum wherein both signals, namely the main signal and the diversity signal, have high amplitude in the maximum power combining are privileged in the combining process compared to sections having weaker signals. The power, in particular, reaches its maximum when, above all else, the sections having high amplitude are added in proper phase. By contrast thereto, an addition that is poor in terms of phase of sections of a spectrum having low amplitudes only slightly changes the overall power. The sections having low amplitudes, however, should not be further attenuated in the combining process. In terms of its effect, the combiner circuit of the present invention combines the maximum power principle with the minimum dispersion principle. It, thereby, avoids the disadvantages of the latter principle, works with the goal-oriented adjustment method of the maximum power method for the combining phase and makes the possibility of too great a drop of the signal at the combiner output impossible that would otherwise be established.

Therefore, a combiner circuit is provided for signals received via a main antenna and a diversity antenna of a radio link utilizing the maximum power method, whereby the phase of one of the signals is varied such that the power of the aggregate signal subsequently formed is optimally high, the circuit being particularly characterized by a control circuit for the combination phase composed of a maximum power control and of two preceding, supplementary circuits, each of which has, respectively, two parallel branches for varying the amplitudes of the main signals and the diversity signals, and by the amplitude variation of main and diversity channel spectrum in such a fashion that the signal spectra are split in the appertaining branches of the two supplementary circuits by, respectively, identically same bandpass filters for the lower spectrum halves and identically same bandpass filters for the upper spectrum halves and the powers of the individual sub-bands are measured at the outputs of the bandpass filters and are set to approximately identical values or to a somewhat higher value of the weaker sub-band by, respectively, boosting the weaker sub-band or by attenuating the more powerful sub-band.

According to a particular feature of the invention, the combiner circuit set forth above is particularly characterized by the utilization thereof in multi-step signal-carrier and two-carrier systems.

According to another feature of the invention, the combiner circuit set forth above is particularly characterized in the utilization of two-circuit bandpass filters that allow only a portion of the upper or, respectively, of the lower spectrum half to pass therethrough.

According to another feature of the invention, the combiner circuit set forth immediately above is particularly characterized in that the weaker sub-band is slightly overboosted.

BRIEF DESCRIPTION OF THE DRAWINGS

Other objects, features and advantages of the invention, its organization, construction and operation will be best understood from the following detailed description, taken in conjunction with the accompany drawings of which.

DESCRIPTION OF THE PREFERRED EMBODIMENTS

Figure 1:
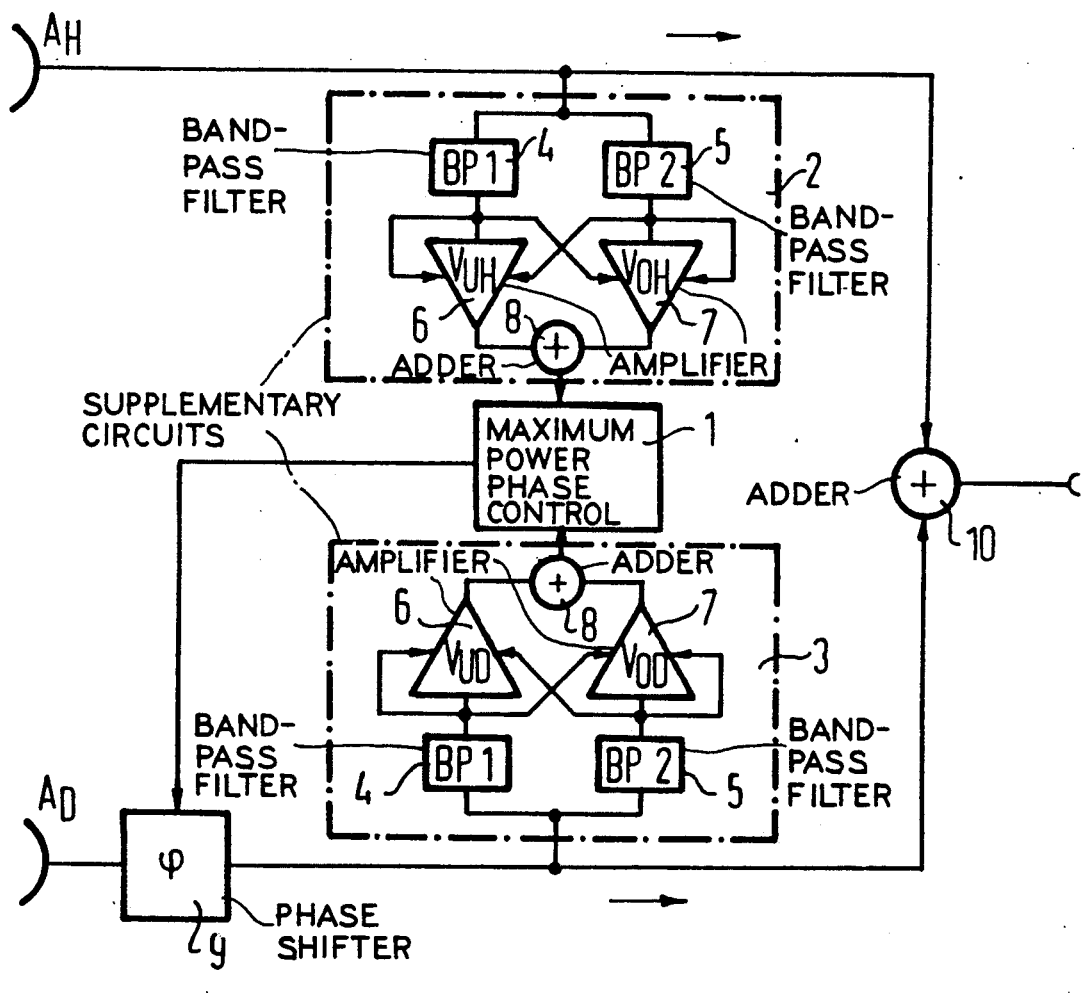
FIG. 1 is a schematic representation of a combiner circuit, shown in a block circuit diagram form, constructed and operated in accordance with the present invention.

A control circuit for the combining phase is illustrated in FIG. 1 as comprising a known maximum power control circuit 1 and two preceding, supplementary circuits 2 and 3 for varying the amplitudes of the main signal and the diversity signal. The main signal and the diversity signal are supplied from the respective antenna $A_H$ or, respectively, $A_D$ to an adder 10 via the main signal path and the diversity signal path. A phase shifter 9 that is driven by the maximum power phase control 1 is inserted in the diversity signal path. The output signals of the two supplementary circuits 2 and 3 inserted between the main signal path or, respectively, the diversity signal path and the maximum power phase control 1 are supplied to the maximum power phase control 1. The circuits 2 and 3 for varying the amplitudes of the main signal and the diversity signal are identically constructed and are each composed of, respectively, two branches lying in parallel to one another. The one branch of the circuits contains a bandpass filter 4 for the lower spectrum halves and a following amplifier 6; the other branch contains a bandpass filter 5 for the upper spectrum halves and a following amplifier 7. The outputs of the amplifiers 6 and 7 are combined via an adder 8.

The amplitude variation of the main channel and the diversity channel spectra is achieved in the following manner: the signal spectra are split by the respectively identical, same bandpass filters 4 for the lower spectrum halves, the bandpass filters 5 for the upper spectrum halves, and the powers of the individual sub-bands are measured at the outputs of the bandpass filters and are, here, referenced $P_{UH}$, $P_{OH}$, $P_{UD}$ and $P_{OD}$. The respectively weaker of the two sub-bands is boosted via the amplifiers 6 ($V_{UH}$, $V_{UD}$) and 7 ($V_{OH}$, $V_{OD}$) until it has the same power as or is somewhat stronger than the other sub-band. The more powerful sub-band, of course, can be attenuated in exactly the same manner.

When, for example, the value $V_{OH}=V_{OD}=1$ is selected and the lower sub-bands are, respectively, amplified/attenuated, then it follows that:

$$V_{UH}=(P_{OH}/P_{UH})^x$$

and $$V_{UD}=(P_{UD}/P_{OD})^x.$$

The powers at the amplifier outputs are:

$$P_{OH}{}^*=P_{OH},$$

$$P_{UH}{}^*=V_{UH}{}^2$$

then $$P_{UH}=(P_{OH}/P_{UH})^{2x}P_{UH}$$

$$P_{OD}{}^*=P_{OD},$$

$$P_{UD}{}^*=V_{UD}{}^2 \cdot P_{UD}=(P_{UD}/P_{OD})^{2x} \cdot P_{UD}$$

Strict power matching is then valid for $x=0.5$: $P_{UD}{}^*=P_{UD}$; $P_{UH}{}^*$, where $x=POH>0.5$ yields a super elevation of the weaker sub-band. The sub-bands are added after the power matching and supplied to the maximum power phase control 1.

The simulation of a 64 QAM two-carrier system yielded the best results with two-circuit bandpass filters that only allow one portion of the upper or, respectively, lower spectrum half to pass and given a slight overboosting ($x=0.6$) of the weaker sub-band.

Figure 2:
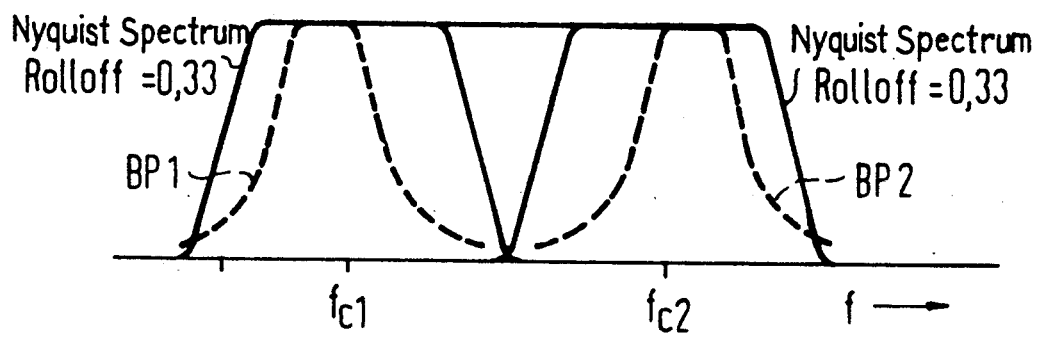
FIG. 2 is a graphic illustration of the selection of the sub-band spectra in a two-carrier system.

FIG. 2 graphically illustrates the selection of the sub-band spectra with the bandpass filters BP1 and BP2, the filters 4 and 5, for a two-carrier system. The Nyquist spectrum is, thereby, entered with solid lines; the sub-band spectrum of the two bandpass filters respectively lying in this region is illustrated with broken lines.

Figure 3:
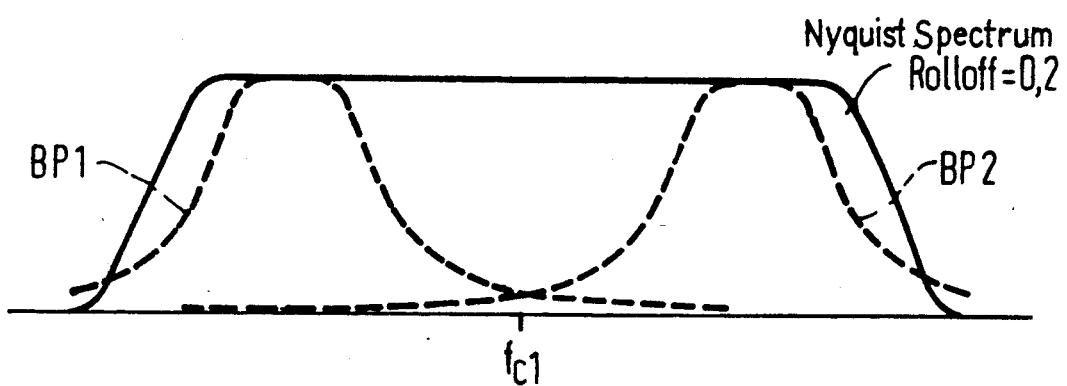
FIG. 3 is a graphic illustration of the selection of a sub-band spectra in a single-carrier system.

Further simulations for 64 QAM and 256 QAM single-carrier systems also show a decrease of the system outages, particularly given predominately-selective fade, when sub-spectra are selected with bandpass filters, as outlined in FIG. 3, and the respectively weaker sub-spectrum had its power boosted somewhat above the power of the sub-band spectrum.

The maximum power combination phase $\phi$ can be theoretically calculated according to the following relationship:

$$\phi = \arctan \left| \frac{\int |S_{ny}| \, |H_H| \, |H_D| \sin(\phi_H - \phi_D) df}{\int |S_{ny}| \, |H_H| \, |H_D| \cos(\phi_H - \phi_D) df} \right|$$

wherein

|Sny| = Nyquist spectrum of the transmitted, individual pulses;
|$H_H$| = amount of the transfer function of the main channel;
|$H_D$| = amount of the transfer function of the diversity channel;
$\phi_H$ = phase of the transfer function of the main channel; and
$\phi_D$ = phase of the transfer function of the diversity channel.

Given utilization respective identical bandpass filters in the phase measuring branch of the main channel and of the diversity channel, as illustrated in FIG. 1, the phases of the spectra that are supplied to the maximum power phase control 1 are varied by the same respective value. The difference $\phi_H^* - \phi_D^*$, however, remains unaltered. The affect of the circuit for power matching extends only to the amplitudes (magnitudes). For calculating the combination phases being set with the circuit of FIG. 1, the amounts of the main channel and the diversity channel transfer functions are to be replaced by $|H_H^*| = |H_H \cdot (H_{BP1} + H_{BP2})|$ and by $|H_D^*| = |H_D \cdot (H_{BP1} + H_{BP2})|$ in the phase equation.

Although we have described our invention by reference to particular embodiments thereof, many changes and modifications of the invention may become apparent to those skilled in the art without departing from the spirit and scope of the invention. We, therefore, intend to include within the patent warranted hereon all such changes and modifications as may reasonably and properly be included within the scope of our contribution to the art.

We claim:

1. In a combiner circuit for first signals received from a main antenna and second signals received from a diversity antenna of a radio link and of the type in which a maximum power method is used, the improvement therein of a combination phase control circuit including a maximum power control circuit and comprising: an output adder connected to said main antenna and to said diversity antenna; a first signal supplementary circuit including first and second channels for varying the amplitudes of the first signals received from the main antenna and connected in parallel between the main antenna and the maximum power control circuit; a second signal supplementary circuit including third and fourth channels for varying the amplitudes of the signals received from the diversity antenna and connected between the diversity antenna and the maximum power control circuit; each of said first and third channels including identical first bandpass filters and each of said second and fourth channels including identical second bandpass filters by which the signal spectra are split into upper and lower spectrum halves; and means in each of said channels for measuring the power of sub-bands at the outputs of said bandpass filters and setting the power of the sub-bands to identical values or to a higher value for the weaker sub-band.

2. The improved combiner circuit of claim 1, and further comprising:
   a phase shifter connected between the diversity antenna and said output adder, said maximum power control circuit connected to control said phase shifter.

3. The improved combiner circuit of claim 1, wherein:
   said means for measuring and setting the outputs of said bandpass filters comprises means for amplifying the weaker sub-band.

4. The improved combiner circuit of claim 1, wherein:
   said means for setting measuring the output of said bandpass filters comprises means for attenuating the more powerful sub-band.

5. In a combiner circuit for first signals received from a main antenna and second signals received from a diversity antenna of a radio link and of the type in which a maximum power method is used, the improvement therein of a combination phase control circuit including a maximum power control circuit and comprising: an output adder connected to said main antenna and to said diversity antenna; a first signal supplementary circuit including first and second channels for varying the amplitudes of the first signals received from the main antenna and connected in parallel between the main antenna and the maximum power control circuit; a second signal supplementary circuit including third and fourth channels for varying the amplitudes of the signals received from the diversity antenna and connected between the diversity antenna and the maximum power control circuit; each of said first and third channels including identical first bandpass filters and each of said second and fourth channels including identical second bandpass filters by which the signal spectra are split into upper and lower spectrum halves; and means in each of said channels for measuring the power of sub-bands at the outputs of said bandpass filters and setting the power of the sub-bands to identical values or to a higher value for the weaker sub-band.

6. In a combiner circuit for first signals received from a main antenna and second signals received from a diversity antenna of a radio link and of the type in which a maximum power method is used, the improvement therein of a combination phase control circuit including a maximum power control circuit and comprising an output adder connected to said main antenna and to said diversity antenna; a first signal supplementary circuit including first and second channels for varying the amplitudes of the first signal received from the main antenna and connected in parallel between the main antenna and the maximum power control circuit; a second signal supplementary circuit including third and fourth channels for varying the amplitudes of the signals received from the diversity antenna and connected between the diversity antenna and the maximum power control circuit; each of said first and third channels including identical first bandpass filters at each of said second and fourth channels including identical second bandpass filters by which the signal spectra are split into upper and lower spectrum halves; and means in each of said channels for measuring the power of sub-bands at the outputs of said bandpass filters and setting the power of the sub-bands to identical values or to a higher value for the weaker sub-band, including means for amplifying the weaker sub-band.

7. In a combiner circuit for first signals received from a main antenna and second signals received from a diversity antenna of a radio link and of the type in which a maximum power method is used, the improvement therein of a combination phase control circuit holding a maximum power control circuit and comprising: an output adder connected to said main antenna and to said diversity antenna; a first signal supplementary circuit including first and second channels for varying the amplitudes of the first signals received from the main antenna and connected in parallel between the main antenna and the maximum power control circuit; a second signal supplementary circuit including third and fourth channels for varying the amplitudes of the signals received from the diversity antenna and connected between the diversity antenna and the maximum power control circuit; each of said first and third channels including identical first bandpass filters and each of said second and fourth channels including identical second bandpass filters by which the signal spectra are split into upper and lower spectrum halves; and means in each of said channels for measuring the power of sub-bands at the outputs of said bandpass filters and setting the power of the sub-bands to identical values or to a higher value for the weaker sub-band, including means for attenuating the stronger sub-band.

8. In a combiner circuit for first signals received from a main antenna and second signals received from a diversity antenna of a radio link and of the type in which a maximum power method is used, the improvement therein of a combination phase control circuit including a maximum power control circuit and comprising; an output adder connected to said main antenna and to said diversity antenna; a first signal supplementary circuit including first and second channels for varying the amplitudes of the first signals received from the main antenna and connected in parallel between the main antenna and the maximum power control circuit; a second signal supplementary circuit including third and fourth channels for varying the amplitudes of the signals received from the diversity antenna and connected between the diversity antenna and the maximum power control circuit; each of said first and third channels including identical first bandpass filters and each of said second and fourth channels including identical second bandpass filters by which the signal spectra are split into upper and lower spectrum halves; and means in each of said channels for measuring the power of sub-bands at the outputs of said bandpass filters and setting the power of the sub-bands to predetermined values.

* * * * *